United States Patent
Zhu et al.

(10) Patent No.: US 11,943,284 B2
(45) Date of Patent: Mar. 26, 2024

(54) OVERLOAD PROTECTION FOR EDGE CLUSTER USING TWO TIER REINFORCEMENT LEARNING MODELS

(71) Applicant: Telefonaktiebolaget LM Ericsson (publ), Stockholm (SE)

(72) Inventors: Zhongwen Zhu, Saint-Laurent (CA); Hatem Abou-zeid, Calgary (CA); Anirudha Jitani, Montreal (CA); Aditya Mahajan, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/027,801

(22) PCT Filed: Oct. 9, 2020

(86) PCT No.: PCT/IB2020/059523
§ 371 (c)(1),
(2) Date: Mar. 22, 2023

(87) PCT Pub. No.: WO2022/074439
PCT Pub. Date: Apr. 14, 2022

(65) Prior Publication Data
US 2023/0344899 A1   Oct. 26, 2023

(51) Int. Cl.
*H04L 67/1008* (2022.01)
*G06N 20/00* (2019.01)

(52) U.S. Cl.
CPC ......... *H04L 67/1008* (2013.01); *G06N 20/00* (2019.01)

(58) Field of Classification Search
CPC ...... H04L 67/1008; H04L 49/50; G06N 20/00
USPC ........................................... 709/231
See application file for complete search history.

(56) References Cited

U.S. PATENT DOCUMENTS

2014/0379938 A1* 12/2014 Bosch ............... H04L 47/125
                                                        709/242
2016/0352867 A1   12/2016 Subbarayan et al.
2019/0182123 A1    6/2019 Gupta et al.

* cited by examiner

*Primary Examiner* — Karen C Tang
(74) *Attorney, Agent, or Firm* — COATS & BENNETT, PLLC

(57) ABSTRACT

An overload protection mechanism for network nodes in an edge node cluster uses two tier reinforcement learning models; one at the edge node level and one at the cluster level. The node level reinforcement learning model optimizes a routing policy for a service/application to determine whether an edge node receiving a client request shall handle the traffic for the service/application. The cluster level reinforcement learning model optimizes a policy for an application that determines which neighboring edge node shall be considered to handle a client request for the given application in case of redirection or proxy by the edge node receiving the client request.

20 Claims, 15 Drawing Sheets

OVERLOAD PROTECTION FOR EDGE CLUSTER USING TWO TIER REINFORCEMENT LEARNING MODELS

TECHNICAL FIELD

The present disclosure relates generally to edge computing and, more particularly, to overload protection for network nodes in an edge node cluster.

BACKGROUND

In order to improve the client experience using mission critical services and applications, cloud providers are moving towards distributed deployments, known as edge computing or edge deployments, where the computational and data storage resources for the services/applications are moved close to the edges of the operator network. The edge nodes providing the services/applications can be deployed in clusters, referred to as edge clusters or edge node clusters at different locations. The edge nodes within a cluster can be implemented as containers or virtual machines in a virtualization environment. A duster of edge nodes provides the high availability for the mission critical services and applications. If one edge node fails, client devices served by the failed edge node can be served by one of the remaining edge nodes in the same cluster without interruption of service. Additionally, the services/applications can be scaled (e.g., deployed or removed) as needed at each location based on the traffic demands for the applications.

To provide geo-redundancy, a cluster can be duplicated at different geographic locations to provide service continuity in case of an outage affecting an entire location. For example, in the event of an earthquake, hurricane or other disaster, client devices served by a cluster of edge nodes at the location affected by the disaster can be served by edge nodes in another cluster at a different geographic location without interruption of service.

One problem encountered in edge cluster deployments is overloading of an edge node by a large number of client requests in a short period of time. There are two common scenarios where overloading may occur. One overloading scenario is associated with live events, such as sporting events or concerts, where a large number of people are gathered in the same place. During such events, the edge node may receive a large number of client requests for a service or application at the same time. A second scenario is when an edge node receives a large number of requests for different applications at the same time. In both cases, the massive influx of client requests at about the same time can cause the edge node to fail.

The failure of the edge node reduces the available resources in the cluster for the services or applications provided by the cluster. The loss of capacity for the service or application is a problem for the platform operator as well as end users who are using the service or application. From the operator perspective, the failure of the edge node makes it more difficult to meet quality of service requirements. From the end user perspective, the failure of the edge node may mean that the service is no longer available to all end users, long latencies and poor user experience. Where multiple services/applications are provided by the edge node or cluster, the failure of one edge node due to client requests for one service/application can impact other services/applications provided by the edge node or cluster.

SUMMARY

The present disclosure relates to methods and apparatus for overload protection for network nodes in an edge node cluster. The overload protection techniques herein described provide proactive overload protection using two tier reinforcement learning models; one at the edge node level and one at the cluster level. The node level reinforcement learning model optimizes a routing policy for a service/application to determine whether an edge node receiving a client request shall handle the traffic for the service/application. The cluster level reinforcement learning model optimizes a policy for an application that determines which neighboring edge node shall be considered to handle a client request for the given application in case of redirection or proxy by the edge node receiving the client request. An edge node receiving a new client request applies the node-level routing policy to determine whether to handle the client request itself, or to redirect or proxy the client request. If the edge node determines to redirect or proxy the client request, the edge node applies a cluster-level redirection or proxy policy to select another edge node in the cluster to handle the client request.

A first aspect of the disclosure comprises methods implemented by a network node in an edge node cluster of overload protection using two tier reinforcement learning models for overload protection. In one embodiment, the method comprises, receiving, from a client device, a client request for an application or service provided by the network node. The method further comprises determining, based on a node-level routing policy for the network node, to redirect or proxy the request. The method further comprises selecting, based on a cluster-level redirection policy or cluster-level proxy policy applicable to the network nodes in the cluster, a target network node in the edge cluster to handle the client request.

A second aspect of the disclosure comprises a network node in an edge node cluster configured to use a two tier reinforcement learning models for overload protection. In one embodiment, the network node is configured to receive, from a client device, a client request for an application or service provided by the network node. The network node is further configured to determine, based on a node-level routing policy for the network node, to redirect or proxy the request. The network node is further configured to select, based on a cluster-level redirection policy or cluster-level proxy policy applicable to the network nodes in the cluster, a target network node in the edge cluster to handle the client request.

A third aspect of the disclosure comprises a network node in an edge node cluster configured to use a two tier reinforcement learning models for overload protection. The network node includes communication circuitry for communicating with client devices over a communication network and processing circuitry. In one embodiment, the processing circuitry is configured to receive, from a client device, a client request for an application or service provided by the network node. The processing circuitry is further configured to determine, based on a node-level routing policy for the network node, to redirect or proxy the request. The processing circuitry is further configured to select, based on a cluster-level redirection policy or cluster-level proxy policy applicable to the network nodes in the cluster, a target network node in the edge cluster to handle the client request.

A fourth aspect of the disclosure comprises a computer program comprising executable instructions that, when executed by a processing circuit in a network node in an edge node cluster, causes the network node to perform the method according to the first aspect.

A fifth aspect of the disclosure comprises a carrier containing a computer program according to the fifth aspect, wherein the carrier is one of an electronic signal, optical signal, radio signal, or computer readable storage medium.

A sixth aspect of the disclosure comprises a non-transitory computer readable storage medium comprising executable instructions that, when executed by a processing circuit in a network node in an edge node cluster, causes the network node to perform the method according to the first aspect.

DETAILED DESCRIPTION

Figure 1:
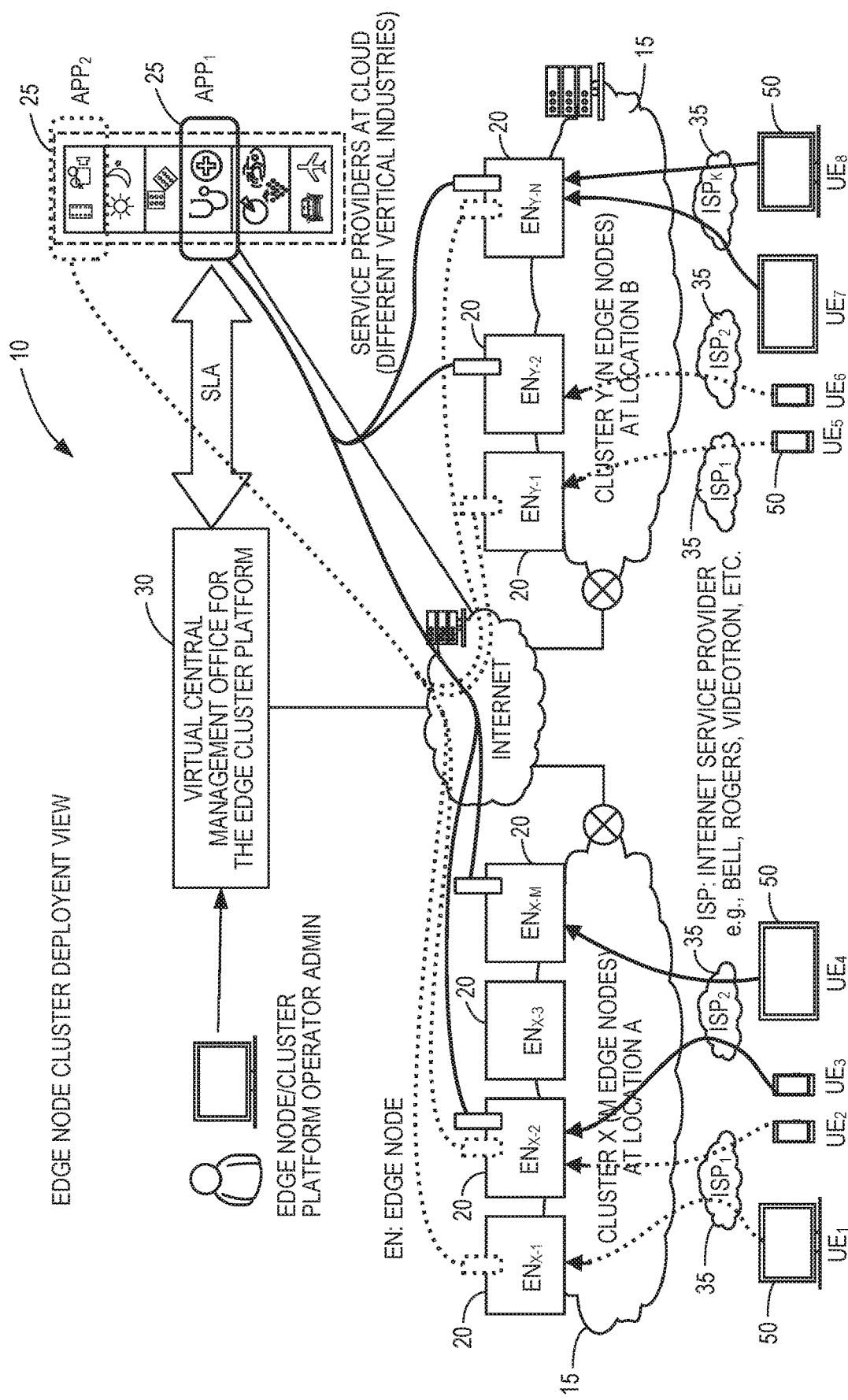
FIG. 1 illustrates an exemplary deployment of edge node clusters at different locations.

Referring now to the drawings, FIG. 1 illustrates an exemplary edge deployment for a service or application in a wide area communication network (WAN) 10. Two edge node clusters 15 are shown and denoted as Cluster X and Cluster-Y. Cluster-X includes edge nodes 20 denoted $EN_{X1}$-$EN_{XM}$. Cluster-Y includes edge nodes 20 denoted as $EN_{Y1}$-$EN_{YN}$. Cluster-X and Cluster-Y are deployed at different geographic locations denoted as Location A and Location B. The edge nodes 20 within a cluster 15 can be implemented as containers or virtual machines in a virtualization environment. Those skilled in the art will appreciate that the edge nodes 20 could also be implemented by standalone computers and servers. In the following description, it is assumed that the edge nodes 20 are implemented by a cloud platform provided by a cloud platform provider. Each edge node cluster 15 is connected via the WAN 10 to a Virtual Central Management Office (VCMO) 30 for the cloud platform. The VCMO 30 orchestrates resource management across different clusters 15 at different locations. The VCMO 30 is operated by an administrator associated with the cloud platform provider. The VCMO 30 is able to deploy or remove applications as needed in the edge node clusters 15 depending on the traffic demands for the applications.

Application service providers can enter into Service Level Agreements (SLAs) with the cloud platform provider to deploy their applications 25 in the edge node clusters 15. In the embodiment shown in FIG. 1, a first application 25 denoted as App1 is deployed to $EN_{X2}$, $EN_{XM}$, $EN_{Y2}$ and $EN_{YN}$. A second application 25 denoted as App2 is deployed to $EN_{X1}$, $EN_{X2}$, $EN_{Y1}$ and $EN_{YN}$. The edge node clusters 15 provide high availability for the applications 25. If an edge node 20 for App1 or App2 fails, client devices 50 served by the failed edge node can be served by one of the remaining edge nodes in the same cluster 15 without interruption of service. For example, if $EN_{X1}$ happens to fail, then $EN_{X2}$ could continue to serve client devices 50 using App2. Alternatively, the VCMO 30 could deploy App2 on another edge node 20, e.g., $EN_{X3}$, which could serve client devices 50 formerly served by $EN_{X1}$.

The deployment of the same applications 25 at different locations as shown in FIG. 1 also provides geo-redundancy. In the event of a catastrophic event, such as an earthquake or hurricane affected a particular location, client devices 50 served by a cluster 15 of edge nodes 20 at the affected location can be served by edge nodes 20 in an edge node cluster 15 at a different geographic location without interruption of service. In the example shown in FIG. 1, client devices 50 served by Cluster-X at Location A can moved to Cluster-Y at Location B in the event of an outage.

Client devices 50 access the services or application offered by the edge node clusters via access networks 35 operated by different Internet Service Providers (ISPs), such as BELL, ROGERS, VIDEOTRON, etc. These access networks are referred to as "last-mile access" networks. The access networks can be radio access networks (RANs), cable network, fiber optic network, or any other type of communication network. The ISPs operating the access network can enter into Service Level Agreements (SLAs) with the cloud platform provider to provide a guaranteed Quality of Service (QoS), such as latency and throughput, to the client devices 50 for the particular applications 25. In some cases, access to the edge node clusters 15 may be provided for free but only with best effort on the network performance, such as latency or throughput.

Figure 2A:
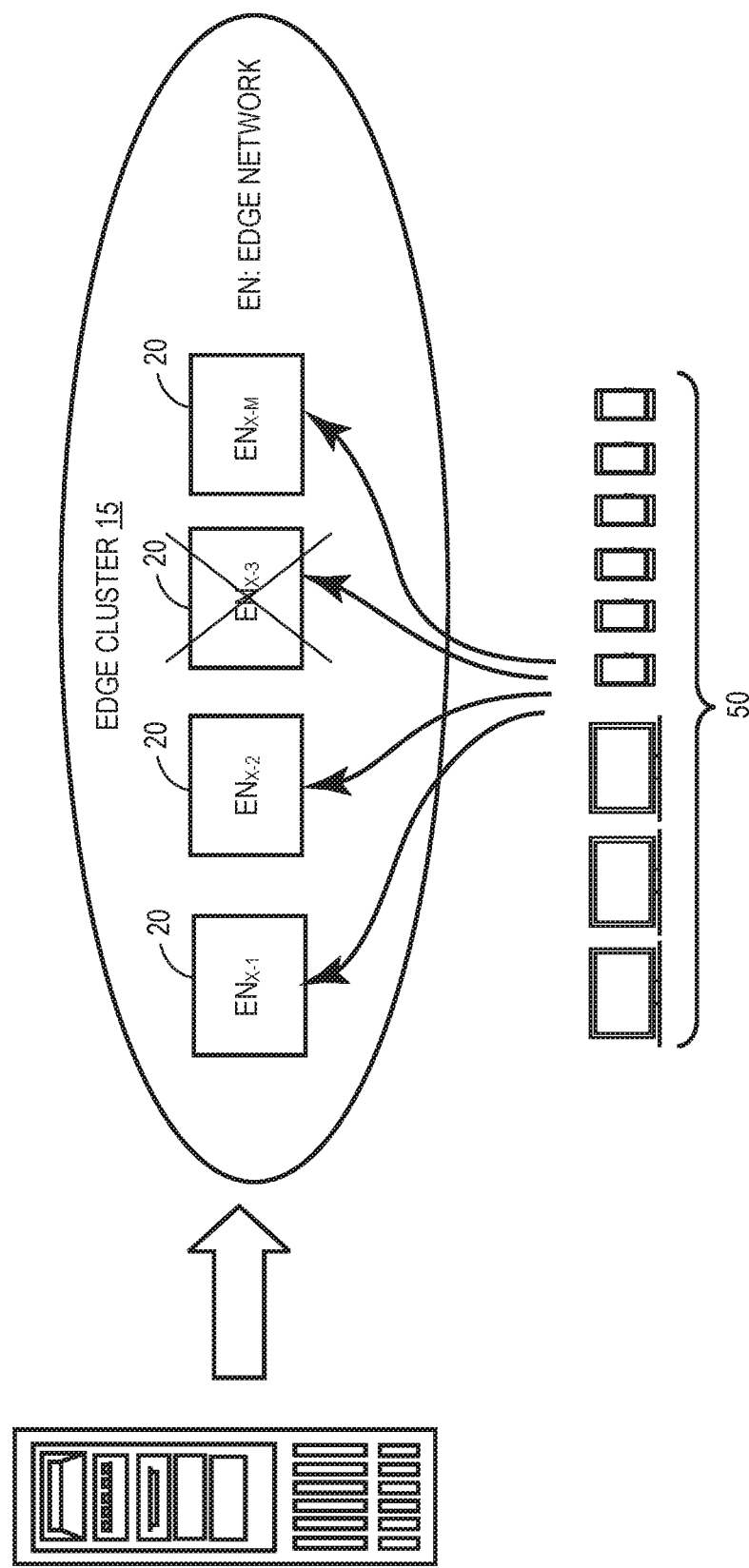
FIG. 2A schematically illustrates overloading of a network node in an edge node cluster.

One problem encountered in edge cluster deployments is overloading of an edge node 20 by a large number of client requests in a short period of time as shown in FIG. 2A. There are two common scenarios where overloading may occur. One overloading scenario is associated with live events, such as sporting events or concerts, where a large number of people are gathered in the same place. During such events, the edge node 20 may receive a large number of client requests for a service or application 25 at the same time. A second scenario is when an edge node 20 receives a large number of requests for different applications 25 at the same time. In both cases, a massive influx of client requests at about the same time can cause the edge node to fail.

The failure of an edge node 20 reduces the available resources in the cluster 15 for the services or applications 25 provided by the cluster 15. The loss of capacity for the service or application 25 is a problem for the cloud platform operator as well as end users who are using the service or application 25. From the perspective of the cloud platform provider, the failure of the edge node 20 makes it more difficult to meet QoS guarantees provided by an SLA. From the end user perspective, the failure of the edge node 20 may mean that the service is no longer available to all end users, long latencies and poor user experience. Where multiple services/applications 25 are provided by the edge node 20 or cluster 15, the failure of one edge node 20 due to client requests for one service/application 25 can impact other services/applications 25 provided by the edge node 20 or cluster 15.

One approach to overload protection solution configures the edge node 20 to stop serving new client requests for all the applications 25 when it is in an "overload" mode, e.g. when Central Processing Unit (CPU) usage has reached to a predetermined level, e.g., 90%, and to begin accepting new client requests when CPU usage down to a "normal" mode (e.g., under 70% CPU usage).

Figure 2B:
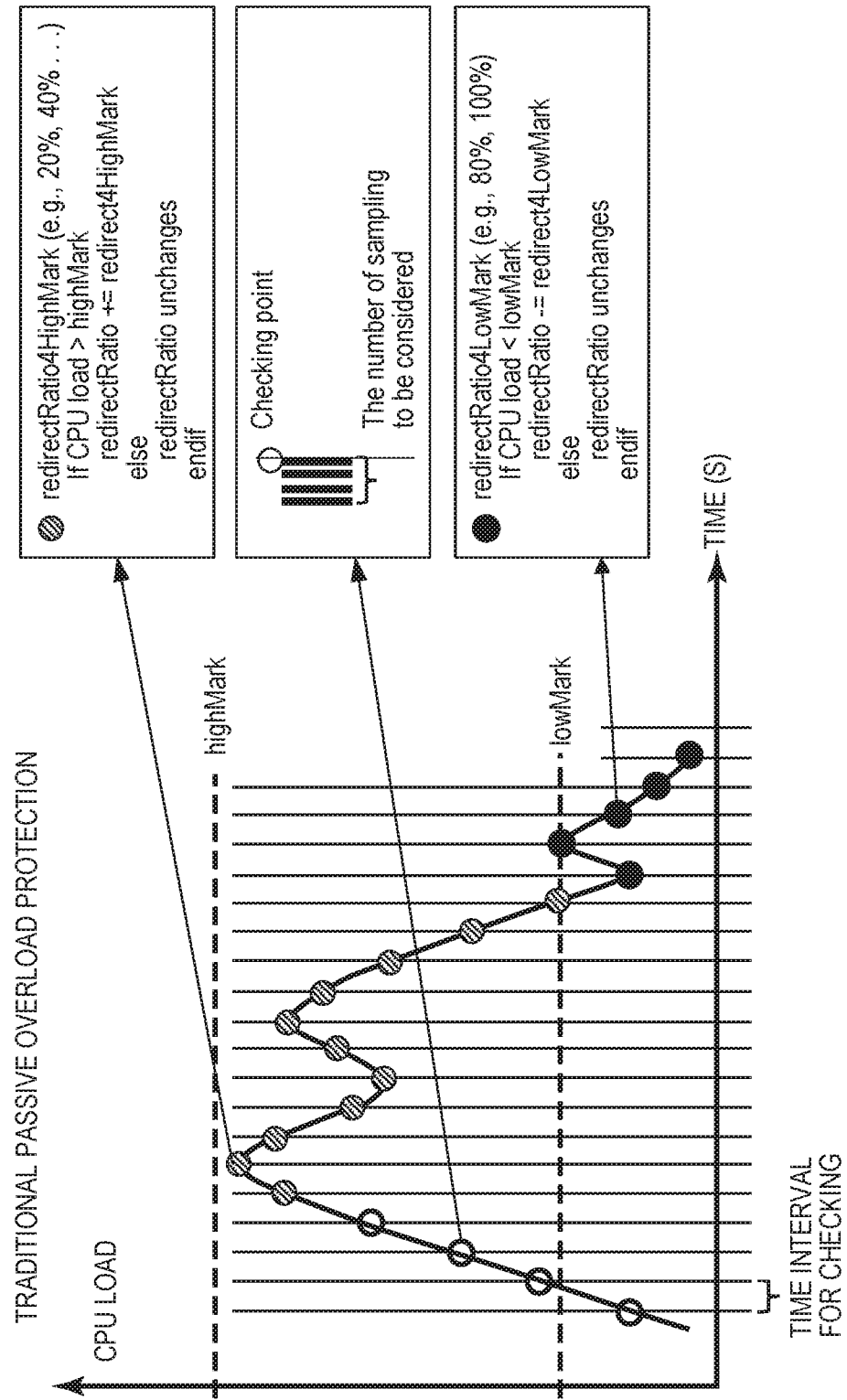
FIG. 2B illustrates an example of CPU load in a network node implementing a reactive overload protection scheme.

A variation of this approach, shown in FIG. 2B, is to gradually decrease the number of new client requests that are accepted once a predetermined threshold is reached instead of rejecting all new client requests. An edge node 20 can apply a so-called "graceful rejection approach" on new client requests for a service or application 25. In one example of this approach, two thresholds denoted highMark and lowMark are used for overload protection. The highMark threshold is the upper limit for CPU load on the edge node 20. The lowMark threshold is the low limit for CPU load on the edge node 20. The thresholds are chosen to provide stable overload protection performance for an edge node 20. At each checking point, indicated by shaded circles, the measurement of CPU load is made based on the number of samples in the given past timeslot.

The CPU load increases while the incoming client traffic increases. When the highMark is exceeded, the edge node 20 enters an overload protection state and starts to redirect/proxy the incoming client traffic. At each verification or checking point for the traffic overload, when the measured CPU load exceeds highMark, the percentage of the client traffics to be redirected or proxied is increased in order to bring down the corresponding CPU load. When the measured CPU load is below the lowMark, the edge node 20 returns to a normal operating state. In the normal operating state, the edge node 20 isn't required to redirect or proxy client requests, but can handle each incoming individual client request according to normal operator policy.

The overload protection mechanism described above can be viewed as a "passive overload protection" approach or "reactive overload protection" approach that is triggered when the highMark is exceeded. If the measured CPU load exceeds the highMark significantly within a very short period, leading to large fluctuations in CPU load with excursion both above the highMark and below the lowMark. In some cases, a sudden influx of a large number of client requests can still overload the edge node 20 before the overload protection mechanism has time to work and lead to an outage or node failure. In addition, the mentioned mechanism is applied at node level, not at application or service level.

According to one aspect of the present disclosure, a proactive overload protection is provided to provide more stable operation in terms of CPU load. The proactive overload protection approach herein described is based on two-tier Reinforcement Learning (RL) models: one at the edge node level and one at the cluster level. Key performance indicators (KPIs) are collected for each of the edge nodes 20 in a cluster 15. The KPIs can include parameters such as CPU load, read input/output (I/O), write I/O, storage usage, number of client requests, etc. The node level RL model uses the KPIs for a particular edge node to optimize a routing policy for a service/application 25 to determine whether an edge node 20 receiving a client request shall handle the traffic for the service/application 25. The cluster level RL model uses the KPIs for multiple edge nodes 20 in the cluster to optimize a policy for an application 25 that determines which neighboring edge node 20 shall be considered to handle a client request for the given application 25 in case of redirection or proxy by the edge node receiving the client request. An edge node 20 receiving a new client request applies the routing policy optimized by the node-level RL model to determine whether to handle the client request itself, or to redirect or proxy the client request. If the edge node 20 determines to redirect or proxy the client request, the edge node 20 applies a redirection or proxy policy optimized by the cluster-level RL model to select another edge node 20 in the cluster 15 to handle the client request.

In addition to applying two-tier RL models, the overload protection approach is designed to optimize policies for applications 25 separately. That is, the routing policy applied by an edge node 20 is optimized by a node-level RL model for each application 25 served by the edge node 20. Similarly, the redirect policy and/or proxy policy applied by the edge node 20 in a cluster 15 is optimized separately for each application 25 by a cluster-level RL model.

Figure 3:
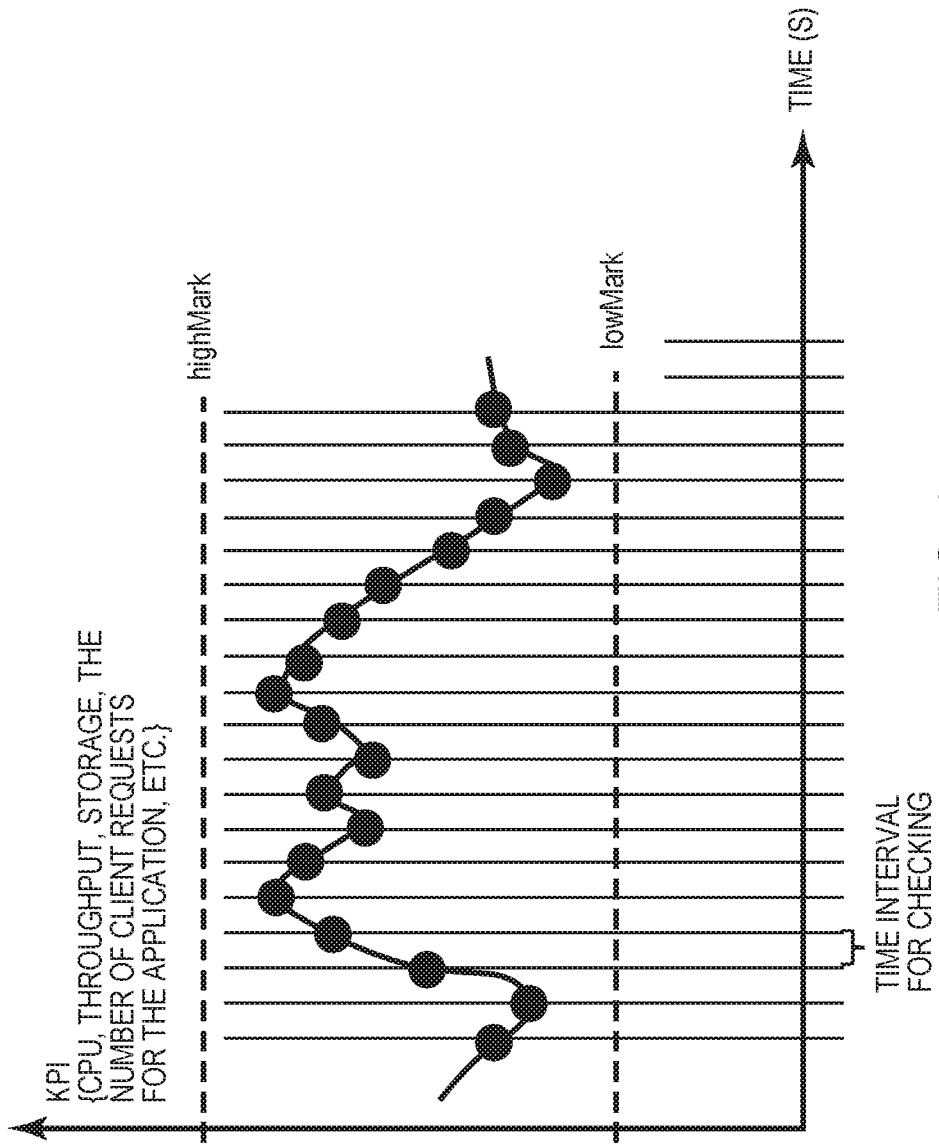
FIG. 3 illustrates an example of CPU load in a network node implementing a proactive overload protection scheme.

FIG. 3 illustrates expected performance of the overload protection mechanism. One objective of the two tier RL approach for overload protection is to reduce fluctuation in the load and to avoid excursions of the CPU load above the highMark and below the lowMark. This stable CPU load achieves the best performance from each edge node 20 in terms of the capacity. In order to provide more granular control at the application level, the number of the client requests for each application 25 is considered in RL modeling as an example. Of course, the other co-relation between node level KPI and corresponding applications 25 deployed in the edge cloud platform can also be taken into account.

Figure 4:
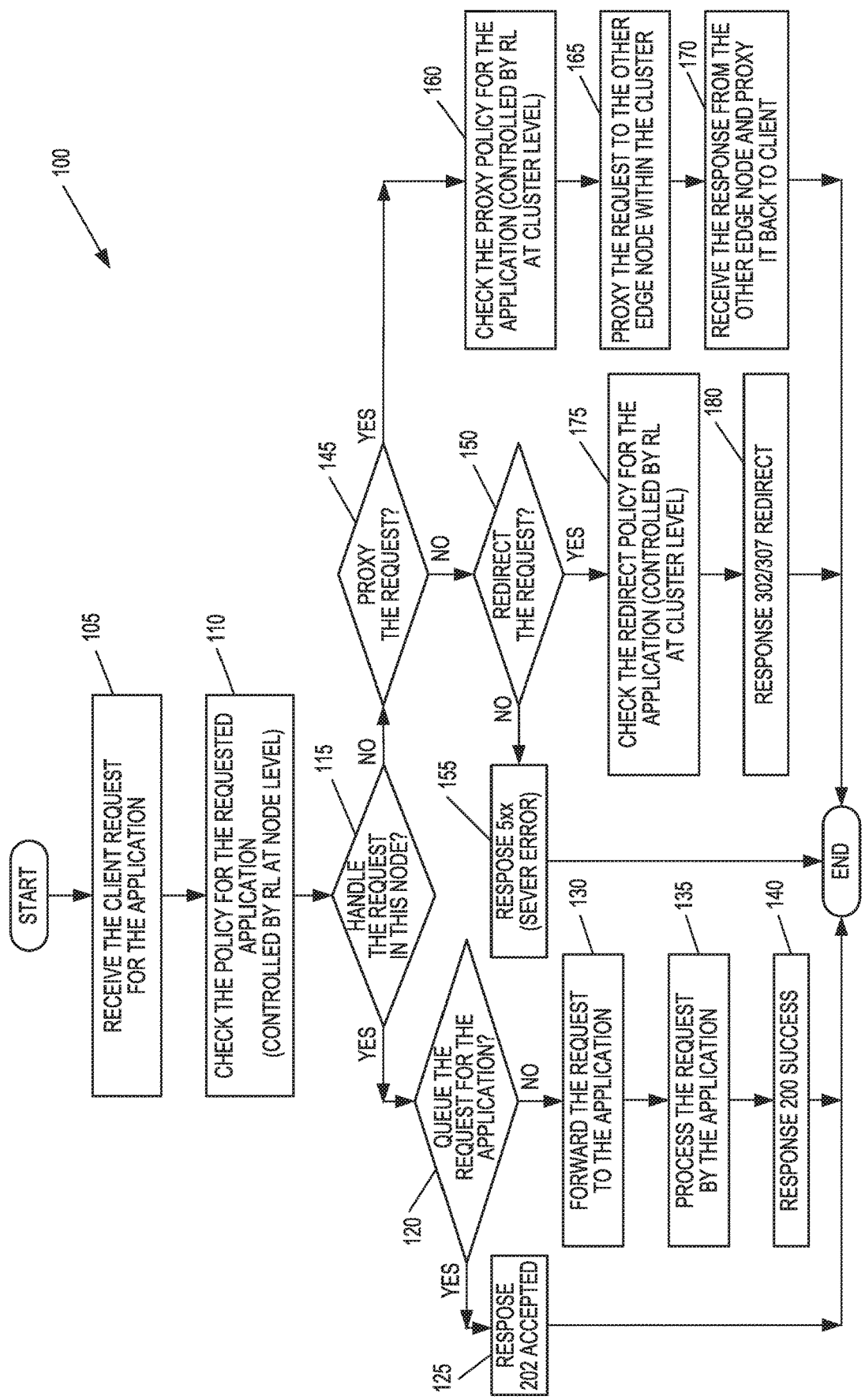
FIG. 4 is a flow chart illustrates a method of overload protection using two tier reinforcement learning models.

FIG. 4 illustrates a procedure 100 for two tier overload protection applied by an edge node 20 implementing the two RL models. As shown in FIG. 4, the decision by an edge node 20 whether to handle a client request for an application 25 is controlled by a routing policy output by a node-level RL model. When the edge node 20 receives a client request for a particular application (105), the edge node 20 checks the node-level routing policy for the application 25 (110) and determines whether to handle the client request itself or to allow another edge node 20 in the cluster 15 to handle the client request (115). The node-level routing policy is optimized by a node-level RL model as previously described based on KPIs associated with the edge node 20 receiving the request. If the edge node 20 determines that it can handle the request, the edge node 20 then determines whether to queue the client request or immediately forward it to the application 25 (120). In the former case, the edge node 20 queues the request and sends a response (e.g., 202 Accepted) to the client device 50 (125). In the later case, the edge node 20 forwards the client request to the application (130). Upon receipt of the client request, the application 25 processes the client request (135) and sends a response (e.g., 200 Success) to the client device 50 (140).

If the edge node 20 determines that it is unable to handle the new client request (115), the edge node 20 determines whether to proxy or redirect or proxy the request to another edge node in the cluster (145, 150). The determination whether to proxy the client request (145) or to redirect the client request (150) is based on the routing policy set by the node-level RL model. If the edge node 20 decides not to proxy or redirect the client request, it sends a response (e.g. 5xx Server Error) to the client device 50 (155) and the procedure ends.

If the edge node 20 determines to proxy the client request, the edge node 20 checks the cluster-level proxy policy for the requested application 25 (160). The proxy policy is created by the cluster level RL model based on the collected KPI dataset for the edge node cluster 15. The KPI dataset for the cluster 15 may comprise the KPIs for all edge nodes 20 in the cluster 15, or the KPIs for a representative sample of the edge nodes 20 in the edge node cluster 15. Based on the cluster-level proxy policy, the edge node 20 selects a neighboring edge node 20 within the cluster 15 as the target and proxies the request to the selected edge node 25 (165). Thereafter, when the edge node 25, now acting as a proxy, receives a response, it proxies the response to the client device 50 (170) and the procedure ends.

If the edge node 20 determines to redirect the client request, the edge node 20 checks the cluster-level redirect policy for the requested application 25 (175). The redirect policy is created by the cluster level RL model based on the collected KPI dataset for the edge node cluster 15. The KPI dataset for the cluster 15 may comprise the KPIs for all edge nodes 20 in the cluster 15, or the KPIs for a representative sample of the edge nodes 20 in the edge node cluster 15. Based on the cluster-level proxy policy, the edge node 20 selects a neighboring edge node 20 within the cluster 15 as the target for the redirect and sends a redirection response to the client device 50 (180).

The end-to-end control flow for the overload protection approach can be divided into four main phases or steps as follows:

Phase 1: Collecting the KPI data set for each edge node 20 and cluster 15;
Phase 2: Processing KPI dataset for RL model training;
Phase 3: Executing RL model to get optimal policy for best rewards (including both exploitation and exploration to get the best performance); and
Phase 4: Applying the routing/proxy/redirect policy by the edge nodes 20.

The node-level RL model and cluster-level RL model are implemented respectively by an Intelligent Node Overload Protector (INOP) 60 and Intelligent Cluster Overload Protector (ICOP) 70 respectively. The INOP 60 and ICOP 70 are described in more detail below.

Figure 5:
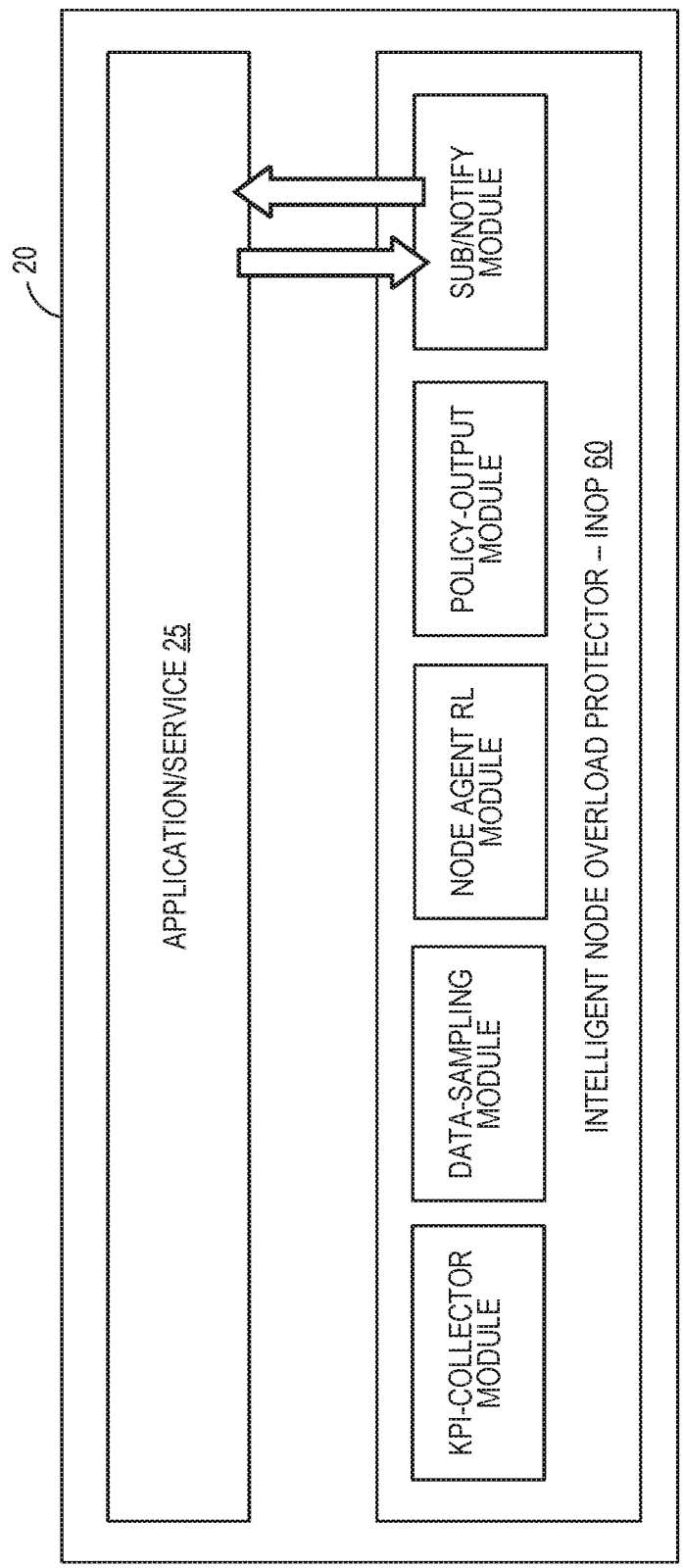
FIG. 5 illustrates an exemplary node-level architecture for INOP

FIG. 5 illustrates an exemplary node-level architecture for a INOP 60. The INOP 60 includes five main components as follows:

1. KPI-Collector module: This module is responsible for collecting the KPI matrix, such as CPU usage, I/O operation (read/write), storage usage, the number of client requests for the application etc., at the node level. The data collection can be achieved through PUSH/PULL mechanisms. With the PUSH mechanism, the external data agent can push the KPI dataset towards the KPI-collector module. With the PULL mechanism, the KPI-collector module fetches the dataset from the edge node 20. The dataset can be transferred through either "streaming" or a batch of files".
2. Data-Sampling module: This module is responsible for cleaning up the KPI dataset as well as converting the collected dataset into a format that is required by the RL training model. It shall raise an alarm when the dataset is missing or contaminated.
3. Node Agent RL module: This module is responsible for training the RL model to get the optimal policy based on the input of the KPI dataset from Data-Sampling module, reward and transition matrix model if required.
4. Policy Output module: This module is responsible for creating the node-level routing policies based on the outcome of Node Agent RL module. It outputs the routing policy that are applied by the applications 25 running in the edge node 20. The notification for any policy change is sent to the Sub/Notify module.
5. Sub/Notify module: This module is responsible for setting up the communication between the edge node 20 and the INOP 60 subsystem. Each application 25 in the edge node 20 shall be able to subscribe to the policy created for the application 25. Once the application 25 has subscribed to receive notifications, the application 25 will receive a notification whenever a change of the subscribed policy is made by the RL model.

Figure 6:
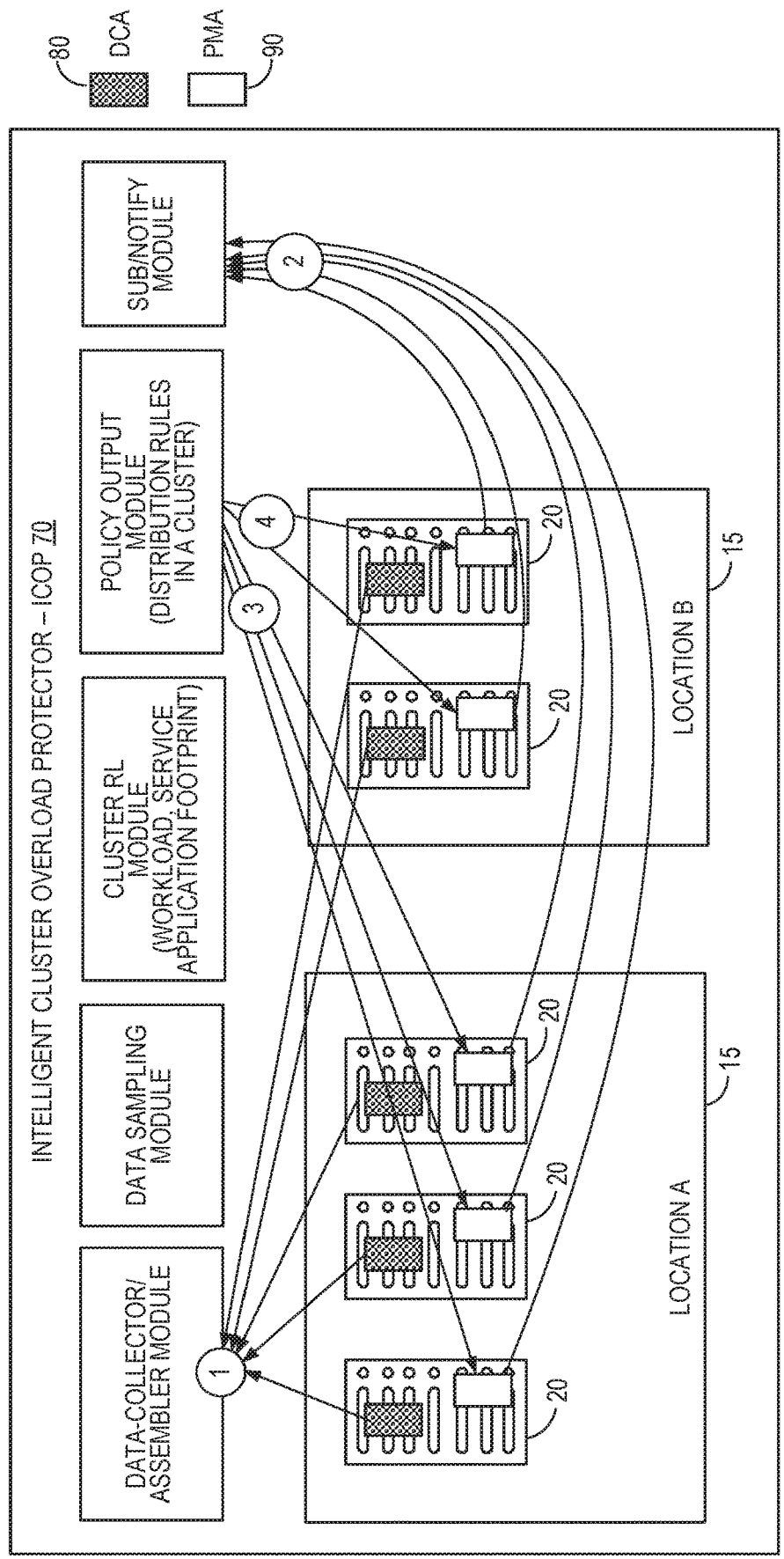
FIG. 6 illustrates an exemplary duster-level architecture for ICOP.

FIG. 6 illustrates an exemplary cluster-level architecture for ICOP 70. The ICOP 70 subsystem includes five main components and relies on two components installed in the edge nodes 20 within the cluster 15.

1. Data-Collector/Assembler module: This module is responsible for collecting the KPI dataset from all the edge nodes 20 within the same cluster 15. It also assembles the samples from different edge nodes 20 together. Those edge nodes 20 can reside at different locations.
2. Data Sampling module: This module is responsible for cleaning the KPI dataset as well as converting the collected KPI dataset into a format that is required by the cluster RL training model. This module can be configured to raise an alarm when the KPI dataset from single or multiple edge nodes 20 are missing or contaminated. The location might be considered as an extra factor in the KPI dataset.
3. Cluster RL module: This module is responsible for training the RL model to get a list of the optimal proxy/redirect policies based on the input of the dataset from Data-Sampling module, reward and transition matrix model if required. In the optimal policy list, each policy linked to the application 25 on the given edge node 20 (location).

At one specific time step, the change can occur for a single policy or multiple policies in the list. The change for those impacted policies is recorded and stored. The storage for these policies might be co-located with ICOP 70 or deployed in a separate node 20.

Figure 7:
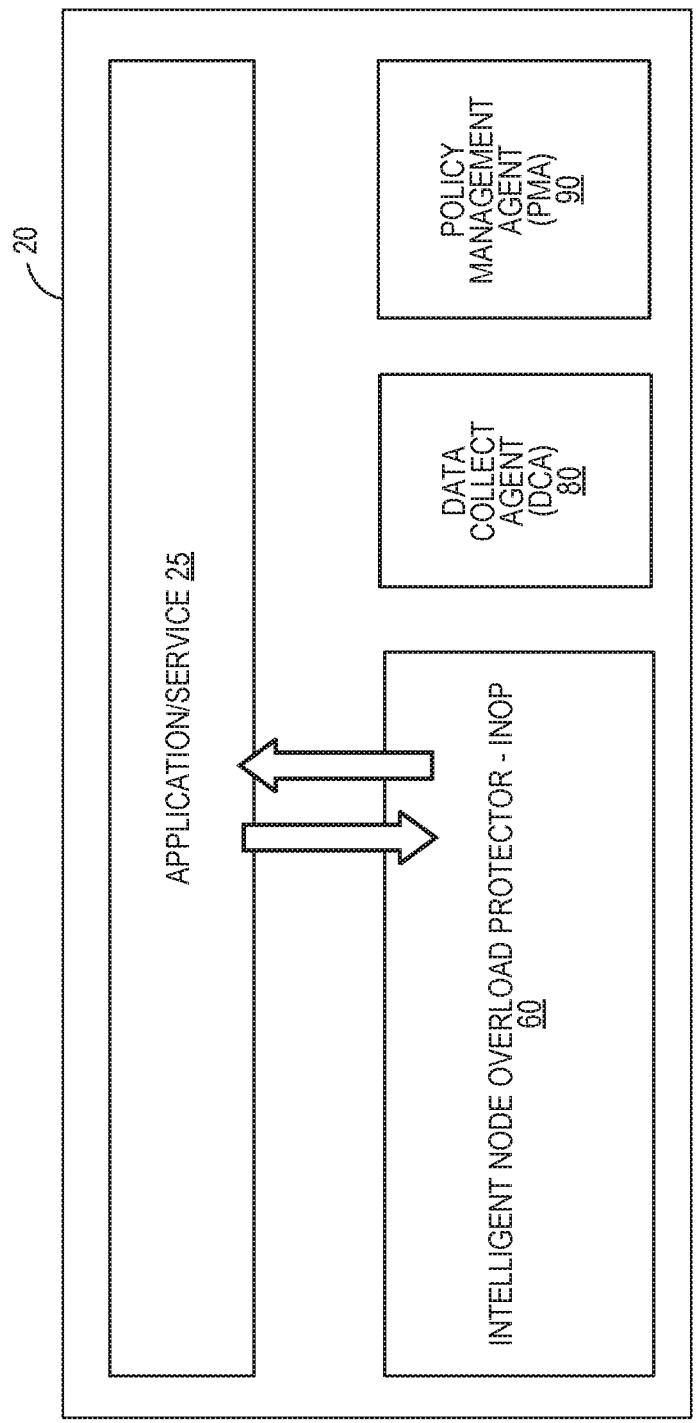
FIG. 7 illustrates an exemplary deployment of the DCA and PMA in an edge node.

4. Policy Output module: This module is responsible for creating the proxy/redirect policies based on the outcome of the Cluster RL module. It outputs the policies that are expected to be changed at next timestep. The notification for any policy change is sent to Sub/Notify module.
5. Sub/Notify module: This module is responsible for setting up the communication between the edge node 20 and ICOP 70 via a Data Collect Agent (DCA) 80 and Policy Management Agent (PMA) 90. The deployment of the DCA 80 and PMA 90 in an edge node 20 is shown in FIG. 7. the interaction between the ICOP 70, DCA 80 and PMA 90 is as follows:
a. Step 1: The Data-Collector/Assembler collects the KPI dataset from the involved edge nodes 20 deployed at different locations. These data transactions are done through DCA 80 periodically.
b. Step 2: the PMAs 90 for the edge nodes 20 at different locations subscribe with the Sub/Notify module in order to receive notifications regarding changes of its proxy policy or redirect policy.

c. Step 3: The edge nodes 20 at location A get their updated policies from ICOP 70 after receiving the notification that the applicable policy has changed.

d. Step 4: The edge nodes 20 at location B get their updated policies from ICOP 70 after receiving a notification that the applicable policy has changed.

In some embodiments, each application 25 in the edge node 20 can subscribe to its own policy. The application 25 will then receive a notification whenever the change of the corresponding policy for the application 25 is made by the cluster RL model.

Figure 8:
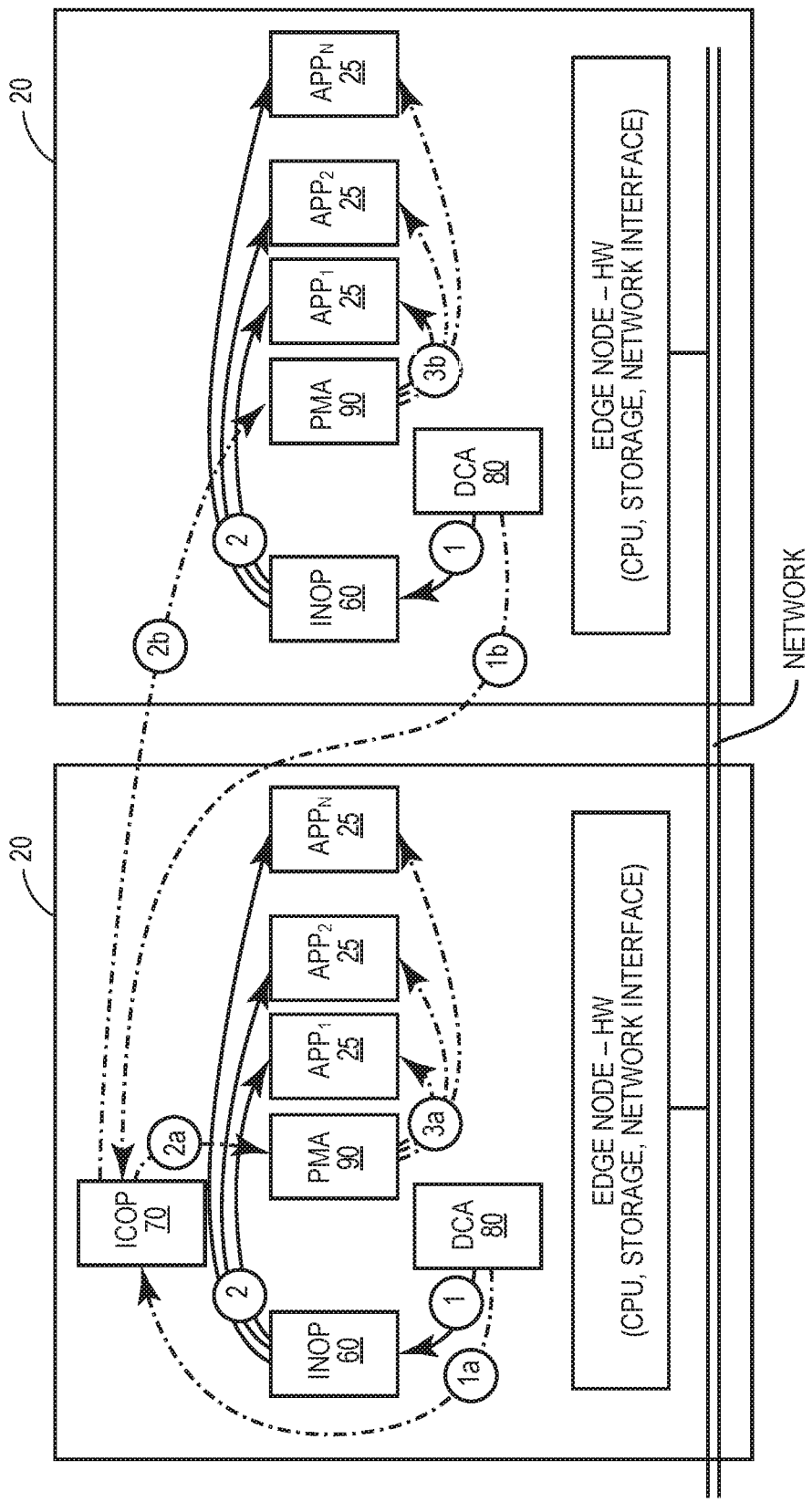
FIG. 8 illustrates an exemplary deployment of INOP and ICOP within a cluster of edge nodes.

FIG. 8 illustrates an exemplary deployment of INOP 60 and ICOP 70 within a cluster 15 of edge nodes 20. Two edge nodes 20 are shown. The edge node 20 on the left in FIG. 8 hosts multiple applications 25 that might be in a microservice form. INOP 60 is installed for node level RL and ICOP 70 is installed for cluster level RL. The DCA 80 retrieves the KPI dataset from the edge node 20 and feeds it into either INOP 60 for the node level RL training model (step 1) and ICOP 70 for the cluster-level RL training model (step 1a). INOP 60 provides the updated policy to the corresponding applications directly (step 2). The PMA 90 is also installed in the edge node 20 to receive the change notification of the corresponding policy. When a change notification is received, the PMA 90 fetches the new policy and feeds the policy to the corresponding application 25 at the edge node 20 (steps 2a and 3a).

In the edge node 20 on the right, only INOP 60, DCA 80 and PMA 90 are installed. The policy for redirect or proxy within a cluster 15 is given by ICOP 70 that is deployed in the neighbor edge node 20 (on the left in FIG. 8). The communication with the ICOP 70 is through a network as shown in FIG. 8. The DCA 80 sends the KPI dataset to ICOP 70 (step 1b). The PMA 90 receives the policy for the application 25 running on the edge node 20 from ICOP 70 (flow step 2b). The PMA 90 feeds those updated policies into the corresponding applications (flow step 3b).

Figure 9:
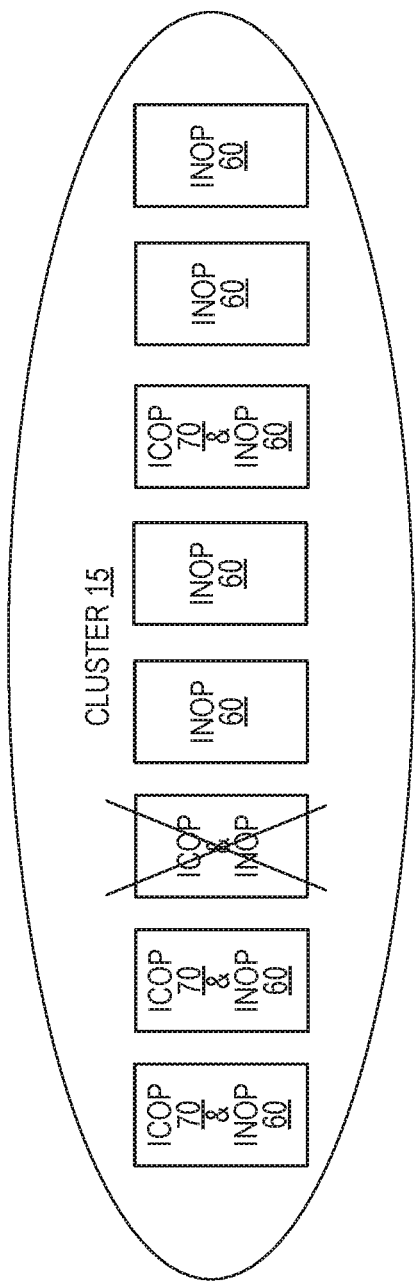
FIG. 9 illustrates a high availability deployment of ICOP in a cluster.

Because ICOP 70 is a central control component for routing the traffic within a cluster 15, high availability (HA) should be considered. The example of ICOP 70 HA deployment is shown in FIG. 9. As indicated in FIG. 9, three edge nodes 20 are picked to form the base for ICOP 70 HA services. If one ICOP 70 crashes, one of the remaining edge nodes 20 will be elected to run ICOP 70 to replace the crashed edge node 20.

Figure 10:
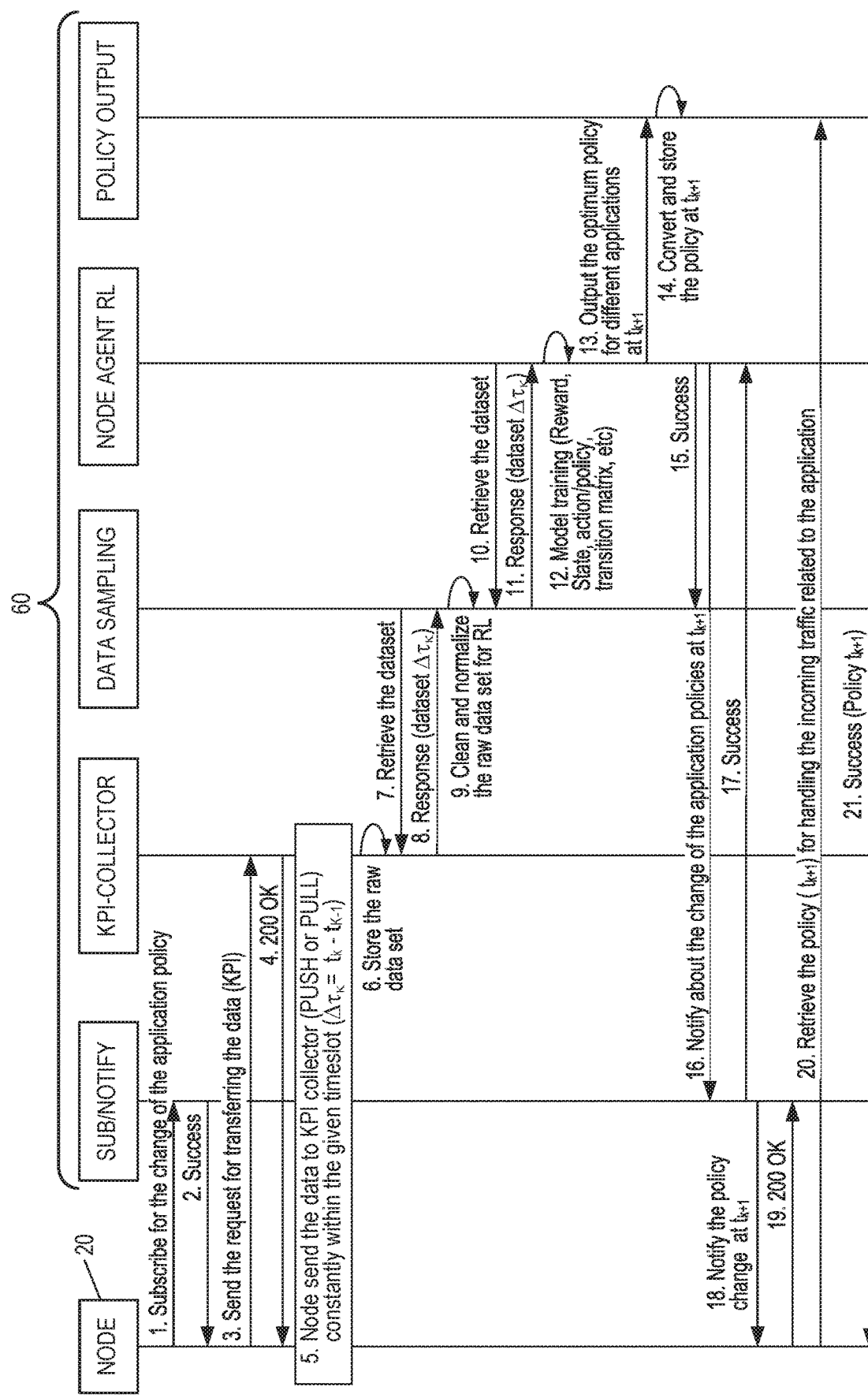
FIG. 10 illustrates an exemplary signaling flow for INOP.

FIG. 10 illustrates an exemplary signaling flow for INOP 60. The following is a detailed explanation of the signaling flow.

1. An application 25 running on the edge node 20 registers with the Sub/Notify module for certain application policies at node level by sending an "subscribe request".
2. The Sub/Notify module sends a confirmation back to the application 25 with the information about the location and identification of KPI-Collector, access token and data transferring method, such as PUSH/PULL, etc.
3. The DCA 80 at the edge node 20 locates the KPI-Collector module and builds-up the data transfer session between edge node 20 and the KPI-Collector module. Although the edge node 20 is considered to be a hardware as an example, it can be a virtual environment, such as VM or container, etc.
4. The KPI-Collector module sends the confirmation on the data transfer session setup.
5. The DCA 80 at the edge node 20 transfers the data to KPI-Collector through the established data transfer session.
6. KPI-Collector stores the raw data in the edge node 20.
7. The Data Sampling module send a request to fetch the raw dataset.
8. The KPI-Collector module returns the response with the requested dataset.
9. After receiving the dataset, the Data Sampling module performs clean-up on the KPI dataset and converts the KPI dataset for INOP 60, which is ready for delivery to the Node Agent RL module.
10. Node Agent RL module fetches the dataset from Data Sampling module.
11. The Data Sampling module provides the dataset in the response. In some implementations, the data transfer can be done through local storage.
12. The Node Agent RL module does the training based on the collected dataset and predicts the optimal policy for the applications to be taken at the next time step.
13. The Node Agent RL module output the optimal policy for applications to Policy output module.
14. The Policy Output module converts and stores the optimal policy for applications at next timestep.
15. The Policy Output module sends a confirmation on the updated policy back to Node agent RL module.
16. The Policy output module informs the Sub/Notify module about the updated policy.
17. The Sub/Notify module sends the confirmation on receiving the notification back to Policy Output module.
18. The Sub/Notify module sends the notification to the corresponding edge node about the change of its policy.
19. After receiving the notification, the edge node 20 sends the confirmation to Sub/Notify module.
20. The edge node 20 sends the request for getting the updated policies to Policy output module.
21. The Policy Output module sends the response with the updated policies to the edge node 20.

Figure 11:
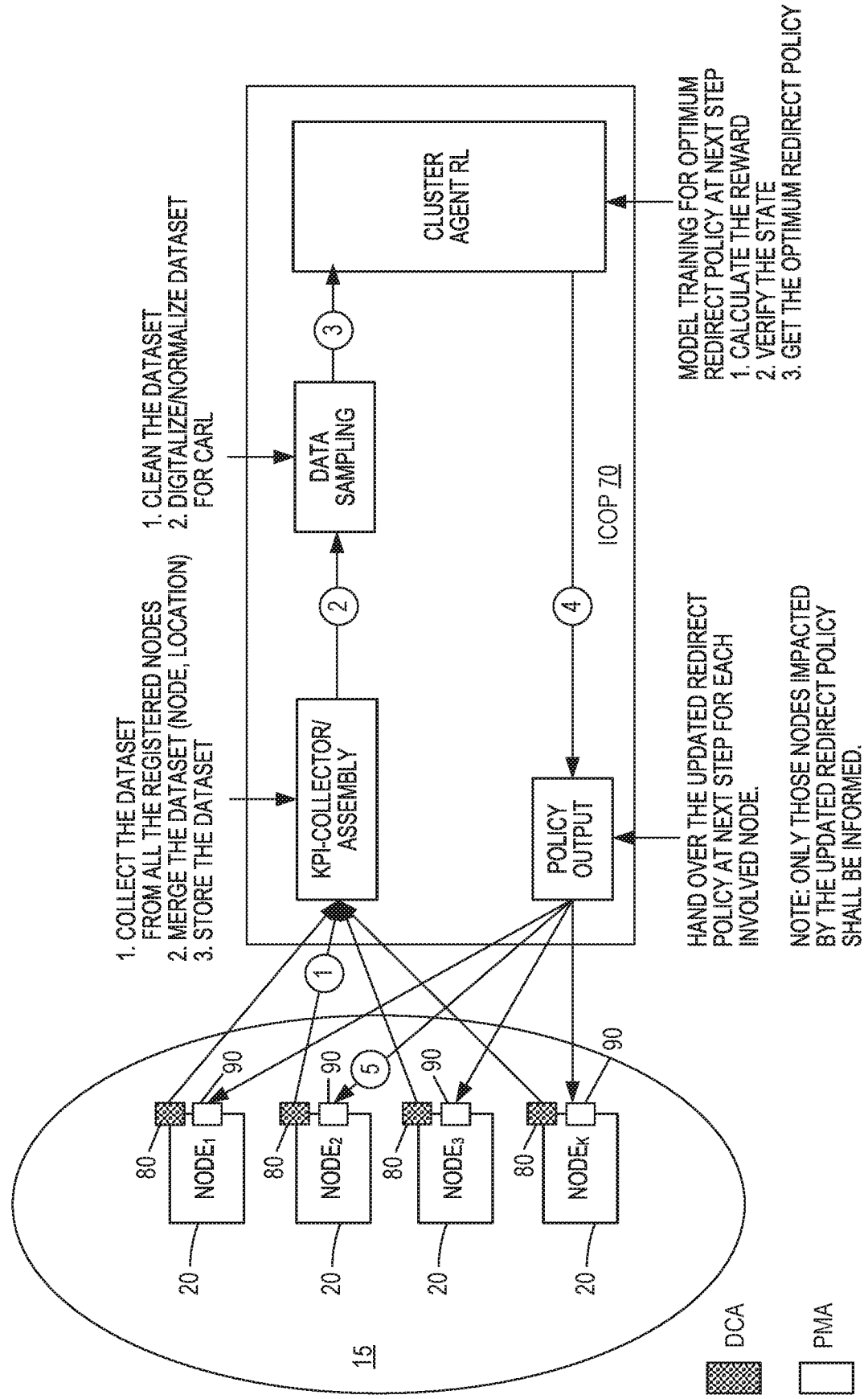
FIG. 11 illustrates an exemplary signaling flow for ICOP.

FIG. 11 illustrates an exemplary signaling flow for ICOP 70. For purposes of illustration, Node2 in FIG. 11 is used to illustrate the control flow for ICOP 70. The following is a detailed explanation of the signaling flow.

1. The KPI-collector module collects the dataset from the edge node 20.
2. The KPI-collector module passes the dataset to Data Sampling module.
3. The Data Sampling module passes the dataset to Cluster Agent RL module after it converts and normalizes the KPI dataset.
4. The Cluster Agent RL module gets the optimal policy for the applications deployed in the edge cluster after training RL model and sends out the policy to Policy Output module.
5. The Policy Output module send the notification to the impacted edge node 20 for the updated application policy. The impacted edge node 20 fetches the updated application policy accordingly.

The overload protection approach described herein based on a two tier RL models provides benefits to service providers, cloud platform operators and end users. For service providers and cloud platform operators, the overload protection based on a two tier RL models reduces the cost for operating the edge node 20 or platform. It also increases the efficiency of utilizing the network and computing resources. For an end user, the overload protection based on a two tier RL models provides increased reliability so that the end user can obtain the service or application without compromising on the service quality and availability.

Figure 12:
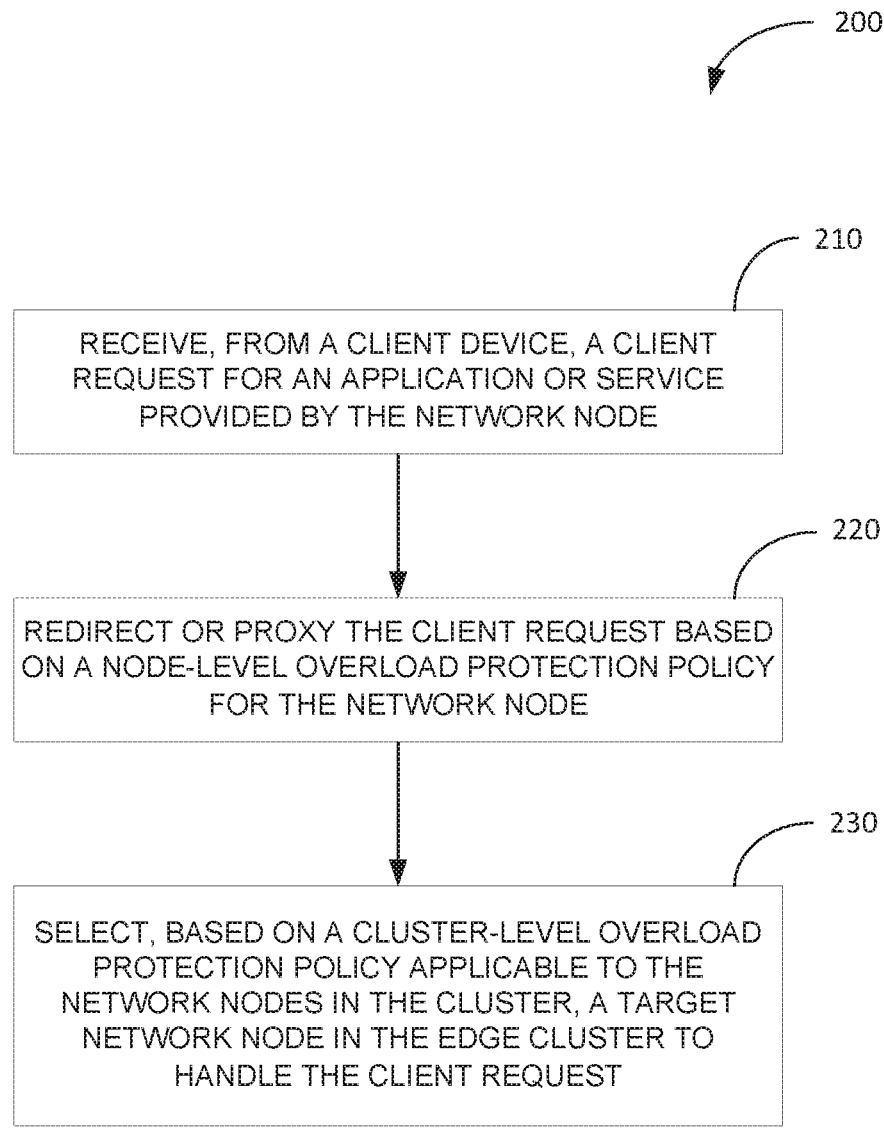
FIG. 12 illustrates a method implemented by a network node of overload protection using two tier reinforcement learning models.

FIG. 12 illustrates an exemplary method 200 implemented by a network node (e.g. an edge node 20) in an edge node cluster 15 of overload protection using two tier reinforcement learning models for overload protection. The network node receives, from a client device, a client request for an application or service 25 provided by the network node (block 210). The network node determines, based on a node-level routing policy, to redirect or proxy the request (block 220). The method further comprises selecting, based on a cluster-level redirection policy or cluster-level proxy policy applicable to the network nodes in the cluster, a target network node in the edge cluster to handle the client request (block 230).

In some embodiments of the method 200, the node-level routing policy is determined by a node-level policy control function implementing a reinforcement learning model based on key performance indicators, usage data and parameters for the network node.

In some embodiments of the method 200, the node-level routing policy is one of two or more application-specific policies for the network node.

Some embodiments of the method 200 further comprise sending a subscription request to a node-level policy control function to receive notification of changes to the node-level routing policy for the application, the request including an application identifier and receiving, from the node-level policy control function, the node-level routing policy for the application.

In some embodiments of the method 200, the node-level policy control function is co-located with the network node.

In some embodiments of the method 200, the cluster-level redirection policy or cluster-level proxy policy is determined by a cluster-level policy control function applying a reinforcement learning model based on key performance indicators, usage data and parameters for two or more network nodes in the edge duster.

In some embodiments of the method 200, the cluster-level redirection policy or cluster-level proxy policy is one of two or more application-specific policies for the edge cluster.

Some embodiments of the method 200 further comprise sending a subscription request to a cluster-level policy control function to receive notification of changes to the cluster-level redirection policy or cluster-level proxy policy for the application, the request including an application identifier and receiving, from the cluster-level policy control function, the cluster-level overload protection policy for the application.

In some embodiments of the method 200, the cluster-level policy control function is co-located with network node.

In some embodiments of the method 200, the cluster-level policy control function is co-located with another network node in the edge cluster.

Some embodiments of the method 200 further comprise collecting data for an input dataset, the data comprising key performance indicators, usage data and parameters for the network node, sending the input dataset to a node-level reinforcement learning model to train the node-level reinforcement learning model and receiving, from the node-level reinforcement learning model, the node-level routing policy.

Some embodiments of the method 200 further comprise collecting data for an input dataset, the data comprising key performance indicators, usage data and parameters for the network node, sending the input dataset to a cluster-level reinforcement learning model to train the cluster-level reinforcement learning model and receiving, from the cluster-level reinforcement learning model, the cluster-level redirection policy or cluster-level proxy policy.

Some embodiments of the method 200 further comprise proxying the client request by sending the client request to the target network node.

Some embodiments of the method 200 further comprise redirecting the client request by sending a redirection response to the client device.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 13:
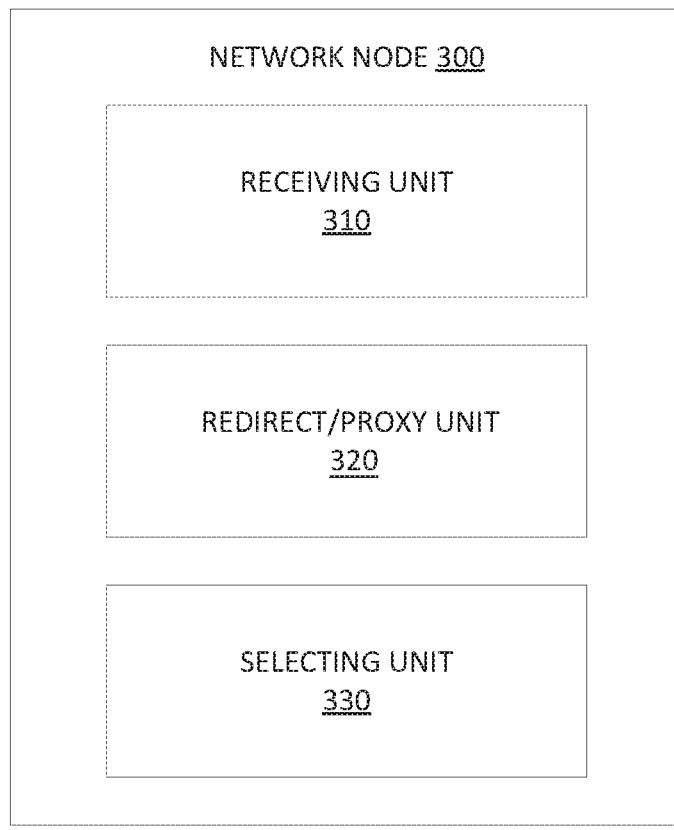
FIG. 13 illustrates a network node configured to use two tier reinforcement learning models for overload protection.

FIG. 13 illustrates an exemplary network node 300 in an edge node cluster 15 configured to use two tier RL models for overload protection. The network node 300 comprises a receiving unit 310), a redirect/proxy unit 320 and selecting unit 330. The various units 310-330 can be implemented by one or more microprocessors, digital signal processors, CPUs, hardware circuits, software or a combination thereof. The receiving unit 310 is configured to receive, from a client device, a client request for an application or service provided by the network node. The redirect/proxy unit 320 is configured to determine, based on a node-level routing policy for the network node, to redirect or proxy the request. The selecting unit 330 is further configured to select, based on a cluster-level redirection policy or cluster-level proxy policy applicable to the network nodes in the cluster, a target network node in the edge cluster to handle the client request.

Figure 14:
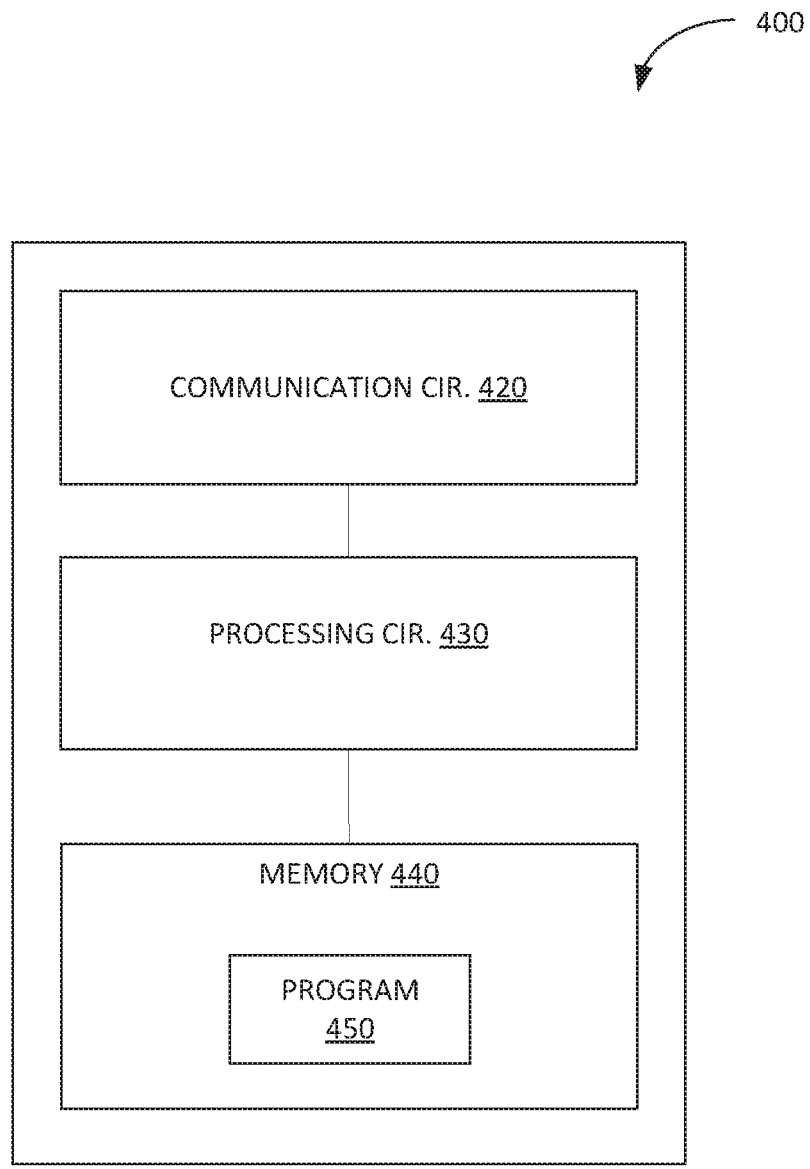
FIG. 14 illustrates another network node configured to use two tier reinforcement learning models for overload protection.

FIG. 14 illustrates the main functional components of another network node 400 in an edge node cluster 15 configured to use two tier RL models for overload protection. The network node 400 includes communication circuitry 420 for communicating with client devices 50 over a communication network, processing circuitry 430 and memory 440.

The communication circuitry 420 comprises network interface circuitry for communicating with client devices 50 and other network nodes over a communication network, such as an Internet Protocol (IP) network.

Processing circuitry 430 controls the overall operation of the network device 400 and is configured to implement the methods shown and described herein. The processing circuitry 430 may comprise one or more microprocessors, hardware, firmware, or a combination thereof configured to perform methods and procedures herein described including the method 100 shown in FIG. 4 and the method 200 shown in FIG. 12. In one embodiment, the processing circuitry 430 is configured to receive, from a client device, a client request for an application or service provided by the network node. The processing circuitry 430 is further configured to determine, based on a node-level routing policy for the network node, to redirect or proxy the request. The processing circuitry 430 is further configured to select, based on a cluster-level redirection policy or cluster-level proxy policy applicable to the network nodes in the cluster, a target network node in the edge cluster to handle the client request.

Memory 440 comprises both volatile and non-volatile memory for storing computer program 450 and data needed by the processing circuitry 430 for operation. Memory 440 may comprise any tangible, non-transitory computer-readable storage medium for storing data including electronic, magnetic, optical, electromagnetic, or semiconductor data storage. Memory 440 stores a computer program 450 comprising executable instructions that configure the processing circuitry 430 to implement the method 200 shown in FIG. 12. A computer program 450 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 450 for configuring the processing circuitry 430 as herein described may be stored in a removable memory, such as a portable compact disc, portable digital video disc, or other removable media. The computer program 450 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

What is claimed is:

1. A method of overload protection implemented by a network node in an edge cluster comprising two or more network nodes, the method comprising:
   receiving, from a client device, a client request for an application or service provided by the network node;
   determining, based on a node-level routing policy for the network node, to redirect or proxy the client request; and
   selecting, based on a cluster-level redirection policy or cluster-level proxy policy applicable to the network nodes in the edge cluster, a target network node in the edge cluster to handle the client request.

2. The method of claim 1, wherein the node-level routing policy is determined by a node-level policy control function implementing a reinforcement learning model based on key performance indicators, usage data and parameters for the network node.

3. The method of claim 1, wherein the node-level routing policy is one of two or more application-specific policies for the network node.

4. The method of claim 3, further comprising:
   sending a subscription request to a node-level policy control function to receive notification of changes to the node-level routing policy for the application, the subscription request including an application identifier; and
   receiving, from the node-level policy control function, the node-level routing policy for the application.

5. The method of claim 4, wherein the node-level policy control function is co-located with the network node.

6. The method of claim 3, further comprising:
   sending a subscription request to a cluster-level policy control function to receive notification of changes to the cluster-level redirection policy or cluster-level proxy policy for the application, the subscription request including an application identifier; and
   receiving, from the cluster-level policy control function, the cluster-level redirection policy or cluster-level proxy policy for the application.

7. The method of claim 6, wherein the cluster-level policy control function is co-located with network node.

8. The method of claim 6, wherein the cluster-level policy control function is co-located with another network node in the edge cluster.

9. The method of claim 1, wherein the cluster-level redirection policy or cluster-level proxy policy is determined by a cluster-level policy control function applying a reinforcement learning model based on key performance indicators, usage data and parameters for two or more of the network nodes in the edge cluster.

10. The method of claim 1, wherein the cluster-level redirection policy or cluster-level proxy policy is one of two or more application-specific policies for the edge cluster.

11. The method of claim 1, further comprising:
    collecting data for an input dataset, the data comprising key performance indicators, usage data and parameters for the network node;
    sending the input dataset to a node-level reinforcement learning model to train the node-level reinforcement learning model; and
    receiving, from the node-level reinforcement learning model, the node-level routing policy.

12. The method of claim 1, further comprising:
    collecting data for an input dataset, the data comprising key performance indicators, usage data and parameters for the network node;
    sending the input dataset to a cluster-level reinforcement learning model to train the cluster-level reinforcement learning model; and
    receiving, from the cluster-level reinforcement learning model, the cluster-level redirection policy or cluster-level proxy policy.

13. The method of claim 1, further comprising proxying the client request by sending the client request to the target network node.

14. The method of claim 1, further comprising redirecting the client request by sending a redirection response to the client device.

15. A network node configured to operate in an edge cluster comprising two or more network nodes, the network node comprising:
processing circuitry and memory, the memory storing instructions executable by the processing circuitry whereby the network node is configured to:
receive, from a client device, a client request for an application or service provided by the network node;
determine, based on a node-level routing policy for the network node, to redirect or proxy the client request; and
select, based on a cluster-level redirection policy or cluster-level proxy policy applicable to the network nodes in the edge cluster, a target network node in the edge cluster to handle the client request.

16. The network node of claim 15, wherein the node-level routing policy is one of two or more application-specific policies for the network node.

17. The network node of claim 16, wherein the network node is further configured to:
send a subscription request to a node-level policy control function to receive notification of changes to the node-level routing policy for the application, the subscription request including an application identifier; and
receive, from the node-level policy control function, the node-level routing policy for the application.

18. The network node of claim 16, wherein the network node is further configured to:
send a subscription request to a cluster-level policy control function to receive notification of changes to the cluster-level redirection policy or cluster-level proxy policy for the application, the subscription request including an application identifier; and
receive, from the cluster-level policy control function, the cluster-level redirection or cluster-level proxy policy for the application.

19. The network node of claim 15, wherein the network node is further configured to:
collect data for an input dataset, the data comprising key performance indicators, usage data and parameters for the network node;
send the input dataset to a node-level reinforcement learning model to train the node-level reinforcement learning model; and
receive, from the node-level reinforcement learning model, the node-level routing policy.

20. A non-transitory computer readable medium storing a computer program product for controlling a network node in an edge cluster comprising two or more network nodes, the computer program product comprising software instructions that, when run on the network node, cause the network node to:
receive, from a client device, a client request for an application or service provided by the network node;
determine, based on a node-level routing policy for the network node, to redirect or proxy the client request; and
select, based on a cluster-level redirection policy or cluster-level proxy policy applicable to the network nodes in the edge cluster, a target network node in the edge cluster to handle the client request.

* * * * *